Patented May 30, 1939

2,160,575

UNITED STATES PATENT OFFICE 2,160,575

RECOVERY PROCESS

Donald J. Loder, Wilmington, Del., assignor to E. I. du Pont de Nemours & Company, Wilmington, Del., a corporation of Delaware No Drawing. Application December 13, 1935, Serial No. 54,329

10 Claims. (Cl. 260—541)

This invention relates to a process for the separation of the constituents contained in an organic compound and more particularly to the separation of aliphatic organic acids from complexes containing the same.

An object of the present invention is to provide a process wherein the constituents can be separated from an organic complex containing the same. Another object of the invention is to provide a process wherein a complex containing an aliphatic organic acid constituent and an inorganic constituent can be separated into the acid constituent and the inorganic constituent. A still further object of the invention is to provide a process wherein a complex containing an aliphatic organic acid and a boron-halogen-containing compound can be separated into the aliphatic organic acid and the boron-halogen-containing compound. A further object of the invention is to provide a process wherein organic complexes which have different stable compositions at different pressures may be separated into their components. A more specific object of the invention is to provide a process wherein a complex consisting of acetic acid and boron trifluoride is distilled alternately under super-atmospheric pressure and then sub-atmospheric pressure whereby acetic acid and boron fluoride is recovered. Other objects and advantages of the invention will hereinafter appear.

I have found that complexes containing an organic and an inorganic constituent can be so treated that either the one or the other constituent may be recovered from the complex providing the complex has different constant boiling mixtures at different pressures. In other words, under given pressure conditions one or the other constituents may be driven off by heat until a composition corresponding to a constant boiling mixture is attained. The pressure is changed, the composition again heated to drive off the other constituent until a second constant boiling composition remains. By repeating the separation under the original conditions more of the first separated constituent is removed and by thus alternating between the pressures substantially complete separation is possible.

The process may be conducted by subjecting to distillation the complex under a certain predetermined pressure and subsequently, when a product is obtained, after evolution of a portion of one of the constituents which has a constant boiling point at that pressure, the pressure is either increased or decreased and the distillation continued under the new pressure until another constant boiling mixture remains. The latter constant boiling mixture is attained after the evolution of a portion of the other constituent, which necessarily differs in composition from the first. It will be readily appreciated that when carrying out the distillation in accord with this procedure it is possible to effect an efficient and economical separation of the individual constituents contained in the complex compound.

The process is especially well adapted, for example, for separating acetic acid from its complex with boron fluoride. When applied to this compound the distillation may be carried out upon the product obtained by the interaction of methanol and carbon monoxide in the presence of boron fluoride as the catalyst. The product resulting from this synthesis is an acetic acid-boron buoride complex containing in the order of two mols of acetic acid per mol of boron fluoride. Distillation is initiated at sub-atmospheric pressures, say in the neighborhood of 15 to 20 millimeters and generally below 200 millimeters mercury pressure and continued under this pressure until approximately 10 to 15% of the acetic acid contained in the complex distills over leaving a constant boiling mixture having a composition containing approximately 1.5 mols of acetic acid per mol of boron fluoride. The pressure is then increased to substantially atmospheric pressure, distillation is continued and under this pressure boron fluoride is driven over until the ratio of acetic acid to boron fluoride has again reached substantially that of the complex originally employed; namely, two mols of acetic acid to one mol of boron fluoride. By again subjecting this residue to vacuum distillation another 10 to 15% of acetic acid can be distilled off and by subsequent pressure and vacuum distillations substantially complete separation of the boron fluoride from acetic acid can be realized.

Not only can acetic acid be separated from its complex with boron fluoride in accord with my process, but likewise other aliphatic organic acid complexes with boron-halogen-containing compounds, such, for example, as formic acid, propionic acid, butyric acid, isobutyric acid and the higher aliphatic organic acid complexes of the boron halides particularly. While I have described the separation of acetic acid and other aliphatic organic acids from their complex with boron fluoride other boron halogen containing compounds may, if desired, be the inorganic portion of the complex. For example, the chlorine, bromine, fluorine and iodine compounds of boron and more particularly the simple halides of boron have the characteristics which adapt them for operation in many instances as full equivalents of boron fluoride.

It is not material to my invention that the distillation be initiated under super-atmospheric pressure followed by distillation under atmospheric pressure or sub-atmospheric pressure for in some instances it may be more desirable to initiate the distillation at atmospheric pressure followed by sub-atmospheric pressure or even to initiate the reaction at atmospheric pressure followed by super-atmospheric pressure. The reasons underlying the selection of the two pressure stages are that at one pressure stage, one of the constituents is driven off leaving a different constant boiling mixture. By selecting, therefore, different pressure or vacuum conditions, for the particular complex treated, it is possible to separate into their constituents the complexes which have constant boiling mixtures having dissimilar compositions at different pressures.

I shall now illustrate by way of examples methods of carrying out my process but it will be distinctly understood that the details and proportions therein given will not limit the scope of my invention.

*Example 1.*—An acetic acid-boron fluoride complex containing approximately two mols of acetic acid per mol of boron fluoride is subjected to pressure distillation at approximately 15 mm. and a temperature of approximately 70° C., which distillation is continued until approximately 16% of the acetic acid present is distilled over. The pressure is increased to atmospheric pressure or higher and the mixture again distilled at a temperature of approximately 150° C. whereupon approximately 15% of the boron fluoride present is now driven off. The pressure is again lowered to approximately 15 mm. and approximately 10% of the acetic acid originally present distills over. A second increase in pressure and further distillation drives off an additional 10% of boron fluoride. Additional distillations give off 10% each of the acetic acid and the boron fluoride, the percentage in each instance being based on the amount of either acid or halide originally present in the complex. The temperatures at each stage is substantially the same as the temperature in the corresponding first and second stage.

*Example 2.*—A complex containing approximately 2 mols of acetic acid per mol of boron fluoride was distilled through 5 cycles as shown below with a recovery of 59.5% of the acetic acid originally present. The temperature of distillation at 760 mm. is approximately 150° C. and the temperature at 15 mm. is approximately 70° C. By continuing the cycles a higher percentage would result.

| Cycle | Pres., mm. | Residue mols | | | Condensate mols | |
|---|---|---|---|---|---|---|
| | | HAc | BF$_3$ | Emp. formula | HAc | BF$_3$ |
| Start | 760 | 3.20 | 1.60 | (HAc)$_2$.BF$_3$ | | |
| 1 | 15 | 2.40 | 1.60 | (HAc)$_{1.5}$.BF$_3$ | 0.80 | |
| | 760 | 2.40 | 1.31 | (HAc)$_{1.8}$.BF$_3$ | | 0.29 |
| 2 | 14 | 2.05 | 1.31 | (HAc)$_{1.6}$.BF$_3$ | .35 | |
| | 760 | 2.05 | 1.13 | (HAc)$_{1.8}$.BF$_3$ | | .18 |
| 3 | 15 | 1.75 | 1.13 | (HAc)$_{1.5}$.BF$_3$ | .30 | |
| | 760 | 1.75 | 1.00 | (HAc)$_{1.7}$.BF$_3$ | | .13 |
| 4 | 15 | 1.51 | 1.00 | (HAc)$_{1.5}$.BF$_3$ | .24 | |
| | 760 | 1.51 | .89 | (HAc)$_{1.7}$.BF$_3$ | | .11 |
| 5 | 15 | 1.30 | .89 | (HAc)$_{1.5}$.BF$_3$ | .21 | |

*Example 3.*—A complex containing approximately 2 mols of acetic acid per mol of BF$_3$ was distilled through 3 cycles as shown with a recovery of 43.5% of the acetic acid originally present. The temperature of distillation is substantially the same as that of Example 2. By continuing the cycles a higher percentage would result.

| Cycle | Pres., mm. | Residue mols | | | Condensate mols | |
|---|---|---|---|---|---|---|
| | | HAc | BF$_3$ | Emp. formula | HAc | BF$_3$ |
| Start | 760 | 6.90 | 3.45 | (HAc)$_2$.BF$_3$ | | |
| 1 | 14 | 5.55 | 3.45 | (HAc)$_{1.6}$.BF$_3$ | 1.35 | |
| | 760 | 5.55 | 2.99 | (HAc)$_{1.8}$.BF$_3$ | | 0.46 |
| 2 | 15 | 4.58 | 2.99 | (HAc)$_{1.5}$.BF$_3$ | .97 | |
| | 760 | 4.58 | 2.64 | (HAc)$_{1.7}$.BF$_3$ | | .35 |
| 3 | 15 | 3.90 | 2.64 | (HAc)$_{1.5}$.BF$_3$ | .68 | |
| | 760 | 3.90 | 2.29 | (HAc)$_{1.7}$.BF$_3$ | | .35 |

From a consideration of the above specification it will be appreciated that many changes may be made in the process therein disclosed without departing from the invention or sacrificing any of its advantages.

I claim:

1. In a process for the separation of an aliphatic organic acid from its complex with a boron-fluorine compound, which complex has different constant boiling compositions at different pressures, the step which comprises effecting the separation by distillation under at least two different pressure stages, and alternately conducting the distillation first under one stage and then under the other stage until the desired separation has been effected.

2. In a process for the separation of acetic acid from its complex with boron fluoride the step which comprises effecting the separation by distillation under at least two different pressure stages, and alternately conducting the distillation first under one stage and then under the other stage until the desired separation has been effected.

3. In a process for the separation of propionic acid from its complex with boron fluoride the step which comprises effecting the separation by distillation under at least two different pressure stages, and alternately conducting the distillation first under one stage and then under the other stage until the desired separation has been effected.

4. In a process of separating an aliphatic organic acid from its complex with boron trifluoride, the steps which comprise effecting the separation of the aliphatic organic acid by distillation under a pressure below atmospheric and the separation of the boron trifluoride by heating at a pressure in excess of the pressure first employed.

5. In a process of separating acetic acid from its complex with boron trifluoride, the steps which comprise effecting the separation of the acetic acid by distillation under a pressure below atmospheric and the separation of the boron trifluoride by heating at a pressure in excess of the first pressure used.

6. In a process of separating propionic acid from its complex with boron trifluoride, the steps which comprise effecting the separation of the propionic acid by distillation under a pressure below atmospheric and the separation of the boron trifluoride by heating under a pressure in excess of the first pressure used.

7. In a process of separating butyric acid from its complex with boron trifluoride, the steps which comprise effecting the separation of the butyric acid by distillation under a pressure below atmospheric and the separation of the boron trifluoride by heating under a pressure in excess of the first pressure used.

8. A process which comprises separating acetic acid from its complex with boron trifluoride by heating the complex at pressures below atmospheric to remove by distillation a portion of the acetic acid and subjecting the resulting residue to further heating at pressures above those first employed to remove a portion of the boron trifluoride.

9. In a process for the separation of acetic acid from its complex with boron trifluoride, the ratio of acetic acid to boron trifluoride being at least 1.5 mols of acetic acid per mol of boron trifluoride, the steps which comprise heating the complex under a pressure not greater than 100 millimeters to remove a portion of the acetic acid by distillation, heating further under approximately atmospheric pressure to remove a portion of the boron fluoride and subsequently repeating the vacuum and pressure steps until substantial separation of the acetic acid and boron trifluoride is obtained.

10. In a process for the separation of an aliphatic organic acid from its complex with a boron fluorine compound, the steps which comprise effecting the separation by heating under at least two different pressure stages, and alternately conducting the heating first under one stage and then under the other stage until the desired separation has been effected.

DONALD J. LODER.